United States Patent
Fontecchio et al.

(10) Patent No.: US 7,398,842 B2
(45) Date of Patent: Jul. 15, 2008

(54) ARTICULATING QUAD-DRIVE WHEELCHAIR

(76) Inventors: Bruce E. Fontecchio, 10629 Lakeridge Dr., Old Concord, TN (US) 37922; Brian Mellies, 16414 Riggs Rd., Stilwell, KS (US) 66085

( * ) Notice: Subject to any disclaimer, the term of this patent is extended or adjusted under 35 U.S.C. 154(b) by 326 days.

(21) Appl. No.: 11/137,607

(22) Filed: May 24, 2005

(65) Prior Publication Data
US 2006/0266565 A1 Nov. 30, 2006

(51) Int. Cl.
*B62D 11/02* (2006.01)
*B60K 1/00* (2006.01)

(52) U.S. Cl. .............. 180/6.5; 180/9.48; 180/65.1; 180/907; 180/65.5; 180/242; 280/250.1; 280/304

(58) Field of Classification Search .......... 180/6.5, 180/6.48, 65.1, 907, 65.5, 242; 280/250.1, 280/304
See application file for complete search history.

(56) References Cited

U.S. PATENT DOCUMENTS

| | | | |
|---|---|---|---|
| 4,089,384 A | 5/1978 | Ehrenberg | |
| 4,271,918 A * | 6/1981 | Molby | 180/6.48 |
| 4,633,962 A | 1/1987 | Cox et al. | |
| 4,805,712 A | 2/1989 | Singleton | |
| 5,064,209 A | 11/1991 | Kurschat | |
| 5,096,008 A | 3/1992 | Mankowski | |
| 5,482,125 A | 1/1996 | Pagett | |
| 6,283,237 B1 * | 9/2001 | Muller | 180/6.48 |
| 2001/0018991 A1 * | 9/2001 | Venturi et al. | 180/6.5 |
| 2006/0213705 A1 * | 9/2006 | Molnar | 180/65.2 |

* cited by examiner

*Primary Examiner*—Lesley D. Morris
*Assistant Examiner*—Marlon Arce-Diaz
(74) *Attorney, Agent, or Firm*—Pitts & Brittian, P.C.

(57) ABSTRACT

A self-propelled wheelchair with independently driven wheels and dual support frames connected in an articulating relationship. A front frame supports a seat and a rearward extended pivot connector. A pair of front wheels and left and right front drive units are connected to the front frame. A rear frame includes a forwardly extended pivot joint, a rear support platform having a power source thereon, and a pair of rear wheels and left and right rear drive units connected thereto. An articulating junction is formed by the front frame pivot connector attached to the rear frame pivot joint and providing articulation between the front frame and rear frame. A manually operable control unit includes computer circuitry in connection with each wheel drive unit, wherein manipulation of the control unit actuates each drive unit for control of rotational speed and direction of rotation for each wheel.

4 Claims, 10 Drawing Sheets

ARTICULATING QUAD-DRIVE WHEELCHAIR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a self-propelled wheelchair. More particularly, this invention pertains to a self-propelled wheelchair having independently driven wheels and an articulated support frame.

2. Description of the Related Art

Self-propelled wheelchairs having one or more front wheel drive motors and/or rear wheel drive motors are typically utilized for travel across generally level surfaces. Wheelchairs having multiple motors for simultaneously rotating front wheels and rear wheels are typically designed with the front wheels, or the rear wheels, having a steering mechanism which is controlled by an operator's input to a 'joystick' control device in order to direct the front pair or rear pair of wheels in a selected direction for wheelchair movement.

An example of a multiple motor wheelchair having four electric motors is disclosed in U.S. Pat. No. 4,805,712, issued to Singleton. The multiple motor wheelchair includes an electric motor for driving each respective wheel, and includes a steering linkage having an electric actuator for turning the front wheels in response to manipulation of a joystick by the operator. The multiple motor wheelchair utilizes a rigid frame to which each wheel is rotatably attached, and to which the electric actuator is secured. The rigid frame does not include an articulating portion, therefore the rear wheels follow generally the same track as the front wheels, and the rear wheels rotate in the same direction as the front wheels during wheelchair movement. The turning radius of the multiple motor wheelchair is delineated by a turning angle created by the extension or retraction of the electric actuator connecting to the front wheels which simultaneous steers both front wheels when the electric actuator is activated by the operator.

An example of a wheelchair having an articulated pivot assembly is disclosed in U.S. Pat. No. 4,633,962, issued to Cox et al. The wheelchair includes front and rear sections pivotably connected at an articulated pivot assembly disposed forward of an occupant's seating position which centers the occupant's weight above the rear drive axle and rear wheel drive motor. The wheelchair is guided by a steering wheel mechanism extended above the wheelchair front section including a solid transverse axle extending between the front wheels. The occupant's seating position is supported by the wheelchair rear section having the driven rear wheels attached, and the occupant's feet are supported by the wheelchair front section having the steering front wheels attached. The occupant steers the wheelchair by turning the steering wheel resulting in turning of the front wheels and resulting in the driven rear wheels following along a path of the front wheels. Therefore, a significant turning radius is required for the wheelchair to negotiate left and right turns.

An improved wheelchair is sought which provides individual motors for independently driving each wheel in order to separately rotate each wheel in appropriate rotational directions and at the same or different rotational speeds thereby allowing rapid and precise turning of the wheelchair as controlled by an operator.

In addition, an improved wheelchair is sought including four wheel drive and providing at least one articulation joint between front and rear support frames having respective front and rear wheels independently driven by separate motors to provide rapid turning of the wheelchair substantially within the footprint formed by the wheelchair.

BRIEF SUMMARY OF THE INVENTION

According to one embodiment of the present invention, a self-propelled wheelchair is disclosed which includes four wheel drive and an articulation joint centrally positioned between front and rear support frames. The wheelchair front frame includes a forward portion supporting a seat portion, and a rearward portion extended to a pivot connector. A pair of front wheels are driven by respective left and right front drive units, with each front wheel and associated drive unit disposed proximal of outboard sides of the front frame. A rear frame includes a forward extended pivot receiver and a rearward extended support platform on which a power source is removably positioned. A pair of rear wheels are driven by respective left and right rear drive units, with each rear wheel and associated drive unit disposed proximal of outboard sides of the support platform. An articulating junction is formed by the front frame pivot connector pivotably connected with the rear frame pivot receiver. The articulating junction provides a range of turning angles between the front frame and the rear frame.

A manually operable control unit is in electrical communication with computer circuitry including circuitry for transmission of a plurality of control signals to each drive unit. The computer circuitry and each drive unit are separately in power connection with the power source, whereby the computer circuitry provides for controlled actuation of each drive unit to drive each wheel at a rotational speed and direction of rotation proportional to the operator's directional manipulation of the manually operable control unit. Manipulation of the control unit also directs the wheelchair forward or backward proportional to directional manipulation of the control unit. During forward movement, the wheelchair front frame is turned by the front drive units controlling each front wheel rotational speed. The rear frame is turned when driven backwards by the rear drive units controlling each rear wheel rotational speed. A method of operation of a self-propelled, four-wheel drive wheelchair is also disclosed.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1A:
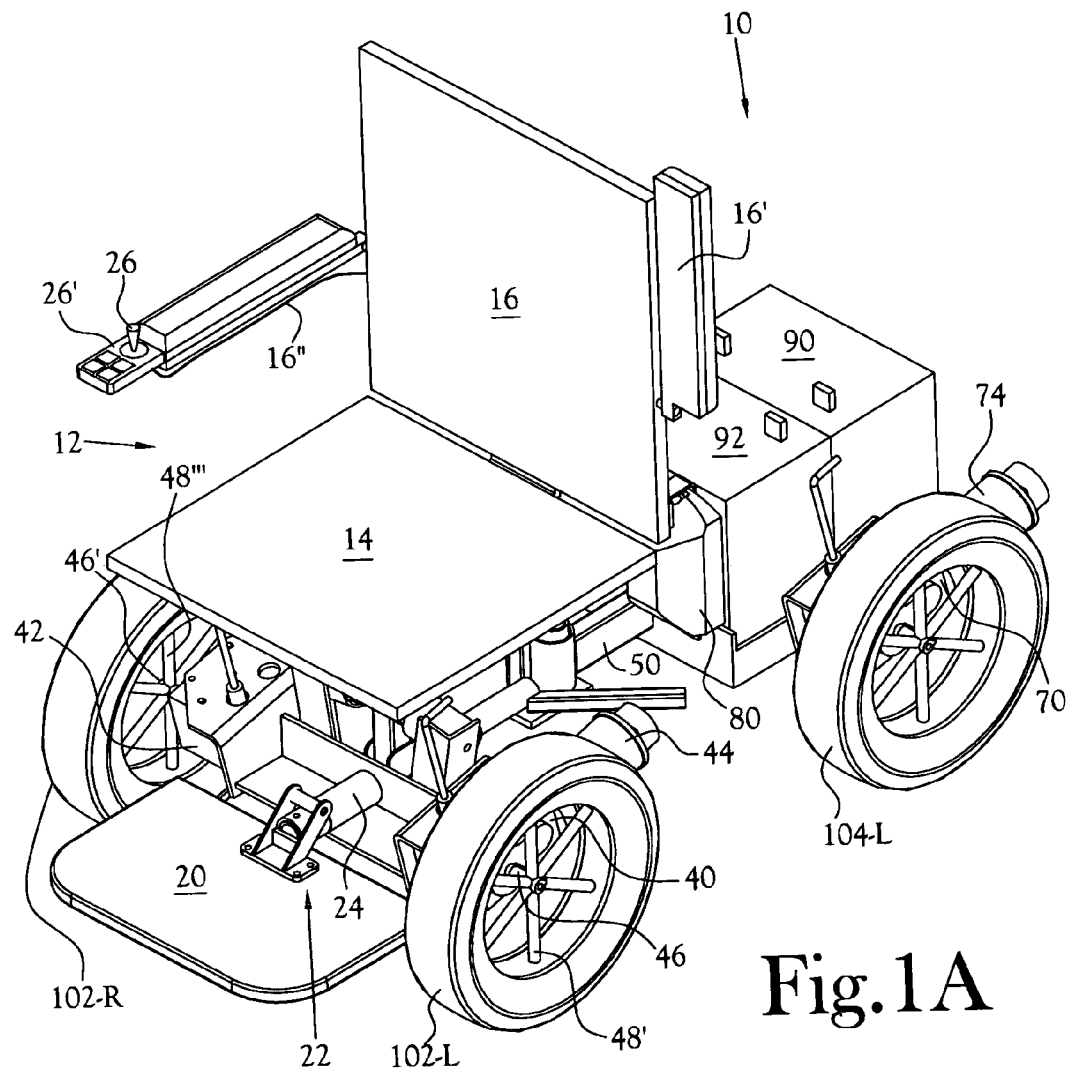
FIG. 1A is a perspective view of an articulating quad-drive wheelchair of the present invention.
Figure 1B:
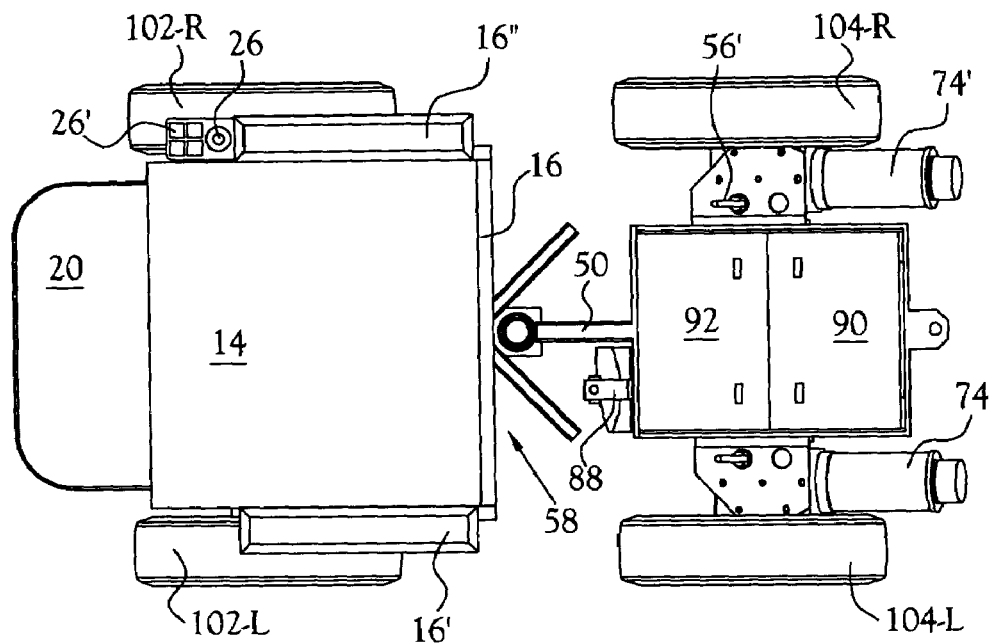
FIG. 1B is an overhead view of a quad-drive wheelchair of FIG. 1A.
Figure 1C:
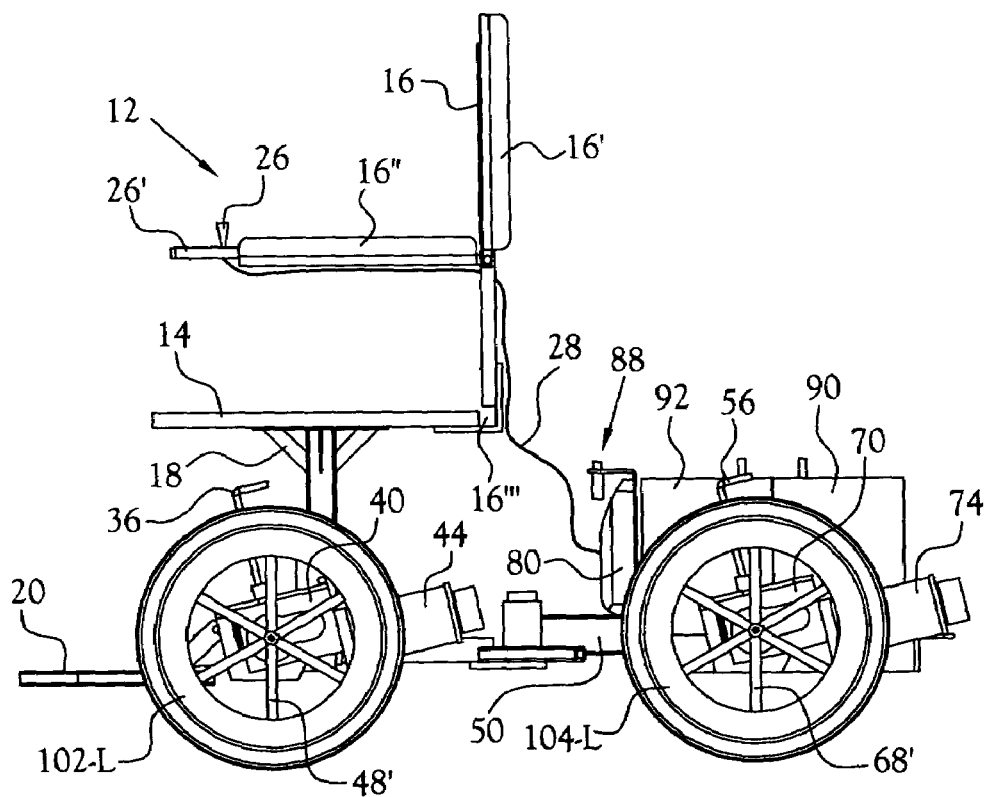
FIG. 1C is a left side view of a quad-drive wheelchair of FIG. 1A.

A self-propelled articulated wheelchair 10 with a four wheel drive and an articulation joint 58 substantially centrally positioned between a front frame 30 and a rear frame 50 is disclosed. The wheels and drive units of the wheelchair 10 are individually controlled by computer circuitry in order to rotate each wheel in appropriate directions and at the same or varying rotational speeds to allow rapid and precise turning of the wheelchair in forward or rearward directions, as directed by a seated operator.

The support chassis of the articulated wheelchair 10 includes a front frame 30 supporting a seat assembly 12 and a folding footrest 20. The seat assembly 12 includes a seat platform 14, and a back support 16 supporting a pivoting right armrest 16" and a pivoting left armrest 16'. To provide convenient access for control of the articulated wheelchair 10, in one embodiment one armrest includes the operator controls, such as a joystick 26 and associated controls 26'. The seat assembly 12 illustrated in FIGS. 1A-4A includes the control means and joystick 26 extended from the right armrest 16". To provide additional comfort for the seat occupant, the seat assembly 12 is supported by a bracket 18' which is disposed in swiveling orientation on a seat support member 18" extended upwards from a connection with a central bracket 30'" encircling the axial member of the front frame 30 (see FIG. 4C). Additional comfort for the seat occupant is provided by the back support 16 being supported by a spring member 16'" and associated connector bracket which allows limited backward travel of the back support 16. The back support spring member 16'" is biased to return the back support 16 to an upright orientation when reclining pressure is reduced by the occupant.

Figure 4A:
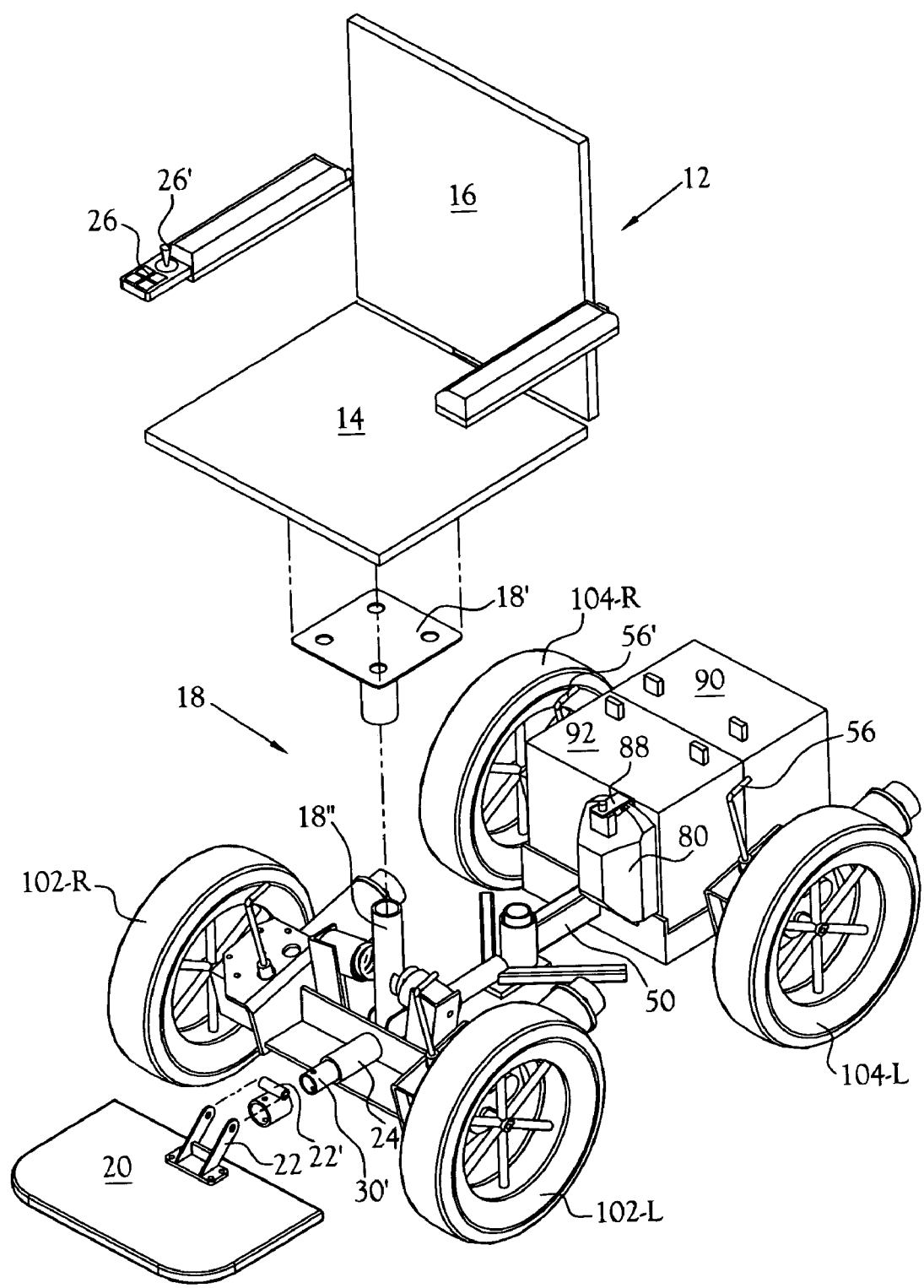
FIG. 4A is a partially exploded view of the pivoting seat and seat support, the folding bracket and the footrest supported by the front frame.
Figure 4B:
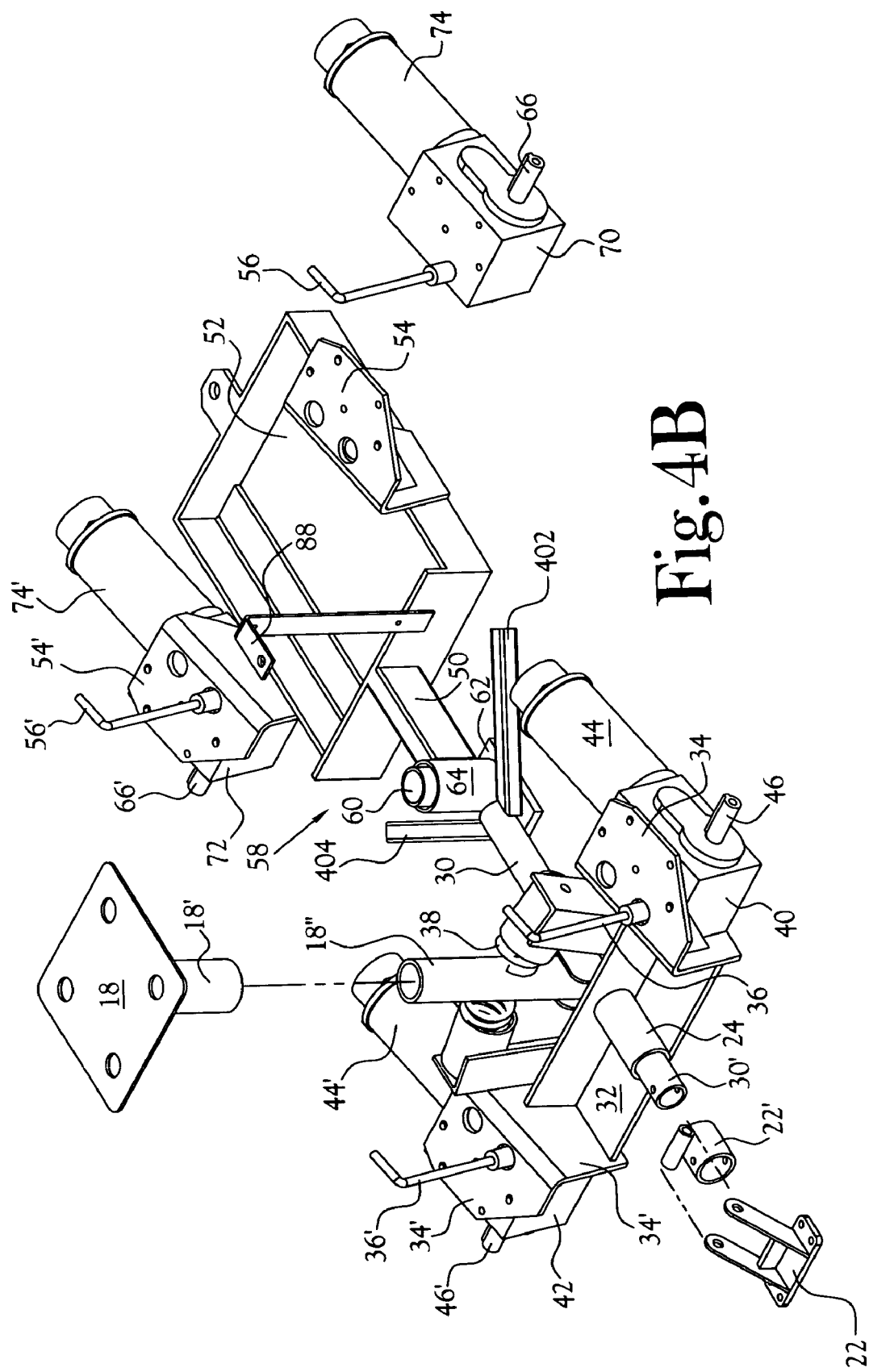
FIG. 4B is a partially exploded view of the pivoting seat support, a height adjustable footrest connector, and drive motor support assemblies for each front and rear wheels.

The foot support assembly 20 includes a pivoting bracket 22 and a cylindrical connector 22' which provides connection to, and limited lateral extension proximal with a forwardly extended connector 24 of a cross-member 32, which is slidably attached to the front frame 30 underneath the seat assembly 12 (see FIGS. 4A and 4B). A range of angle and height adjustments for the foot support 20 is provided by the pivoting bracket 22 being angled relative to cylindrical connector 22' which is slidably engaged with a forward extension of the front frame 30. A limited lateral extension adjustment is provided by the forwardly extended connector 24 being slidably engaged with the forward extension of the front frame 30. The cross-member 32 extends laterally relative to a front portion 30' of the front frame 30 and is positioned underneath the seat assembly 12, in order to support the weight of the seated occupant between the front wheels 102-RL, 102-RR. The weight of an occupant on the seat 14 is supported in swiveling orientation by the seat support member 18" and distributed across the front frame structure including the axial member of the front frame 30, the cross-member 32, and outboard left and right front brackets 34, 34' connected to opposed outer ends of the cross-member 32. By positioning the seat assembly 12 directly above the axial member of the front frame 30, the occupant's weight is evenly distributed between respective wheel axles 46, 46', which extend from respective front drive actuators 40, 42 supported by the left and right front brackets 34, 34' connected to opposed outboard ends of the cross-member 32.

The central axial member of the front frame 30 includes a rearwardly extended pivot connector 60 which serves as a male connector of an articulation joint 58 between the front frame 30 and the rear frame 50. In one embodiment, the pivot connector 60 is configured as a cylindrical member extending vertical above a rear end support bracket 62 of the front frame, over which a female connector having a diameter larger than the pivot connector 60 is pivotably positioned, such as a cylindrical pivot receiver 64 extended forwardly from the rear frame 50 (see FIG. 4C). The rear frame includes a rear support shelf 52 having a sufficient surface area to support at least one power source, and preferably multiple power sources 90, 92, which are removable after being decoupled from the wheelchair control unit 80.

An articulation junction 58 is formed by the front frame pivot connector 60 being pivotably received in the rear frame pivot receiver 64, also referred to as the rear frame pivot joint 64. The articulation junction 58 provides a plurality of turning angles between the rearwardly extension of the central axial member of the front frame 30, and the rear frame pivot receiver 64 extended forwards of the power source platform 52. The centrally positioned articulation joint 58 provides a range of turning angles 98, 98' between the front frame and the rear frame. The range for the turning angles 98, 98' is bounded by the rear bifurcations 402, 404' angled apart at about a sixty degree (60°) angle 98, 98' extended laterally on opposed sides of the front frame pivot connector 60.

Movement of the wheelchair 10 is provided by front wheel drive units and rear wheel drive units, which are independently powered and controlled by a central control unit, or controller, 80. The front wheel drive unit includes a left front wheel actuator 40 having gearing therein, a left front wheel motor 44 providing transmission of power to the wheel actuator 40, and a right front wheel actuator 42 having gearing therein and a right front wheel motor 44' providing transmission of power to drive the actuator 42. The front wheel drive units are maintained in power communication by electrical connections with the power sources 90, 92 supported by the rear frame 50 on a storage platform 52. Each front wheel actuator 40, 42 is connected by respective left and right drive shafts 46, 46' (see FIGS. 1A and 5), from which respective left and right front wheels 102-L, 102-R are attached to rotate when driven by each front wheel motor 44, 44'. As illustrated in FIG. 4B, rear wheel support brackets 54, 54' are connected to opposed sides of the storage platform 52. The rear wheel drive unit includes a left rear wheel actuator 70 having gearing therein, a left rear wheel motor 74 providing transmission of power to drive actuator 70, and a right rear wheel actuator 72 having gearing therein, and a right rear wheel motor 74' providing transmission of power to drive the actuator 72. The front and rear wheel drive units are maintained in power communication by electrical connections with the power sources 90, 92 supported on storage platform 52. Each rear wheel actuator 70, 72 is connected by respective left and right rear drive shafts 66, 66' (see FIG. 4B), from which respective left and right rear wheels 104-L, 104-R are attached to rotate when driven by each rear wheel motor 74, 74'. For repairs and/or replacement of each wheel drive unit, disconnection is facilitated for each front wheel drive unit 40, 44 and 42, 44' from respective support brackets 34, 34', by tools 36, 36'. Further, disconnection is facilitated for each rear wheel drive unit 70, 74 and 72, 74' from respective support brackets 54, 54' by tools 56, 56' as illustrated in FIG. 4B.

Figure 4C:
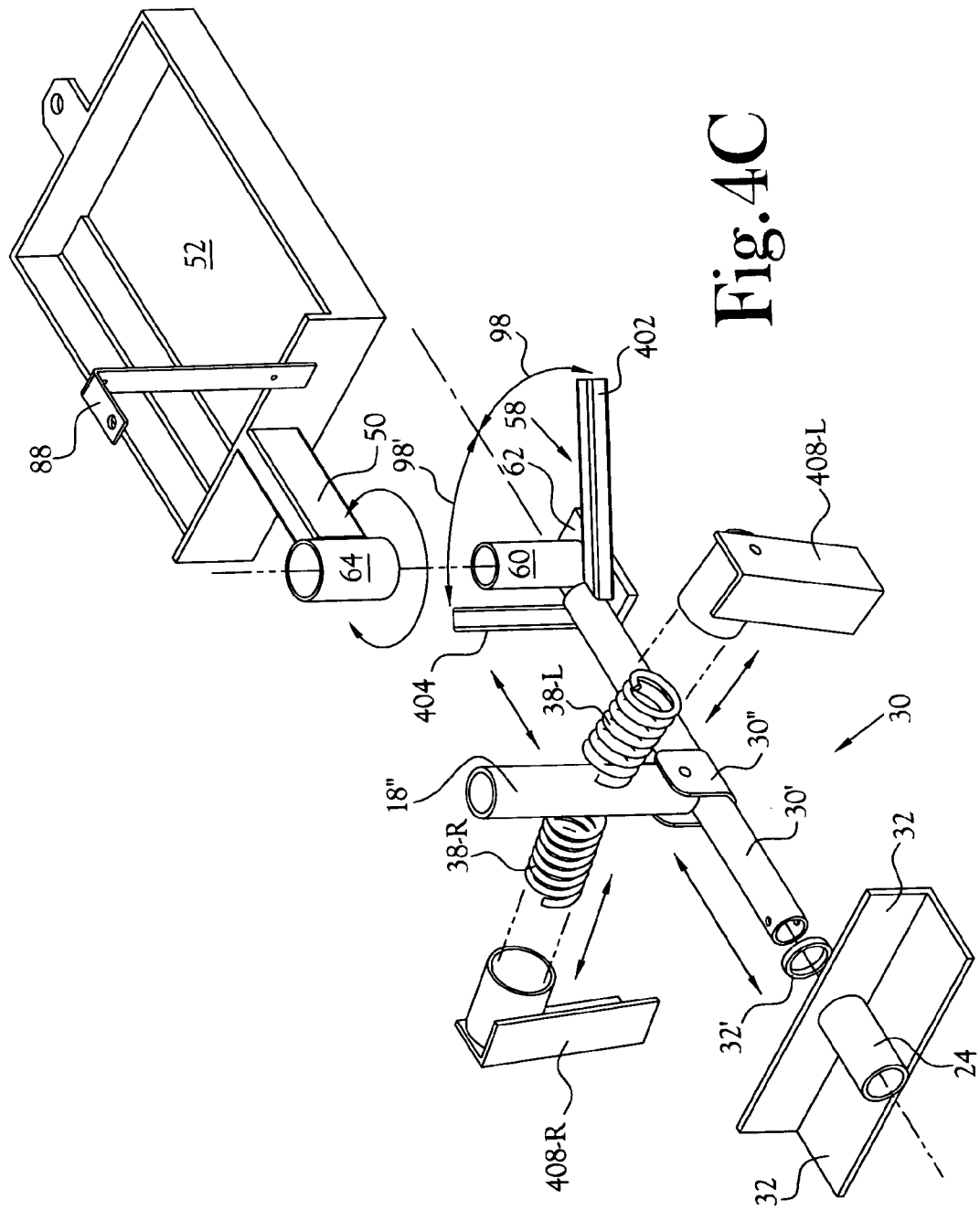
FIG. 4C is an exploded view of the front frame including a cross-member, a front wheel suspension unit, a front pivot connector and a rear pivot receiver forming an articulating joint between the front and rear frames.

A front seat assembly lateral support system is illustrated in FIG. 4C, including spring members 38-L, 38-R extended laterally on opposed sides of the seat support member 18". On the outboard ends of both spring members 38 are rigidly positioned support brackets 408-L, 408-R providing lateral support for each spring member 38. The lower ends of the upright support brackets 408 are preferably secured to a rearward side of the cross-member 32. The spring members 38 provide lateral support for the seat support member 18" in order to minimize lateral swaying of the seat support 18" and seat assembly 12 when a seated occupant and the wheelchair 10 traverse uneven terrain.

A manually operable control unit, commonly referred to as a "joystick" 26 and associated controls 26', is in electrical communication by at least one electrical connection 28 with the computer module 80 including circuitry for transmission of a plurality of control signals to each drive unit 44, 44', 74, 74'. The computer circuitry and each drive unit are separately in electrical connection with the power supply, whereby the computer circuitry provides for controlled actuation of each drive unit 44, 44', 74, 74' for control by actuators 40, 42, 70, 72 to drive each respective wheel 102-L, 102-R, 104-L, 104-R at equal, or different rotational speeds and/or different directions of rotation proportional to the operator's directional manipulation of the manually operable joystick 26. As an example, upon manipulation of the joy stick 26 in a forward position without indicating a turn, the circuitry of the computer module 80 directs each wheel drive unit and actuator to propel the wheelchair 10 forward. Upon manipulation of the joy stick 26 in a rearward position without indication of a turn, the circuitry of the computer module 80 directs each wheel drive unit and actuator to propel the wheelchair 10 backwards proportional to the operator's manipulation of the joy stick 26 and the associated controls 26'. The wheelchair 10 is capable of precise changes of direction within generally the wheelchair's footprint, due to the front frame 30 being turned by the front drive units controlling each front wheel rotational speed, and the rear frame 50 being separately guided during turns by the rear drive units 70, 74 and 72, 74' controlling the rear wheel rotational speeds.

Figure 2A:
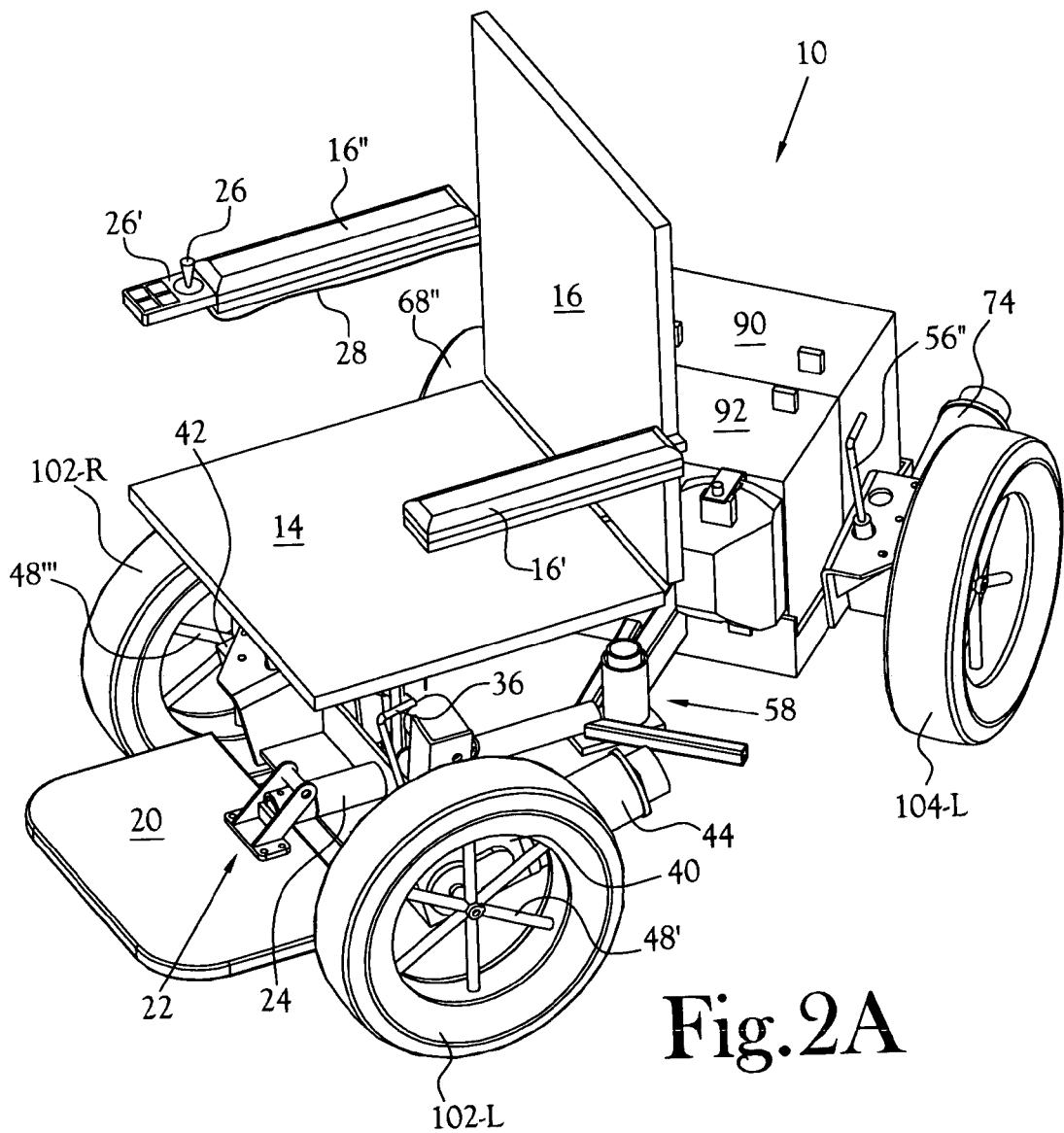
FIG. 2A is a perspective view of the wheelchair articulating for a right turn.
Figure 2B:
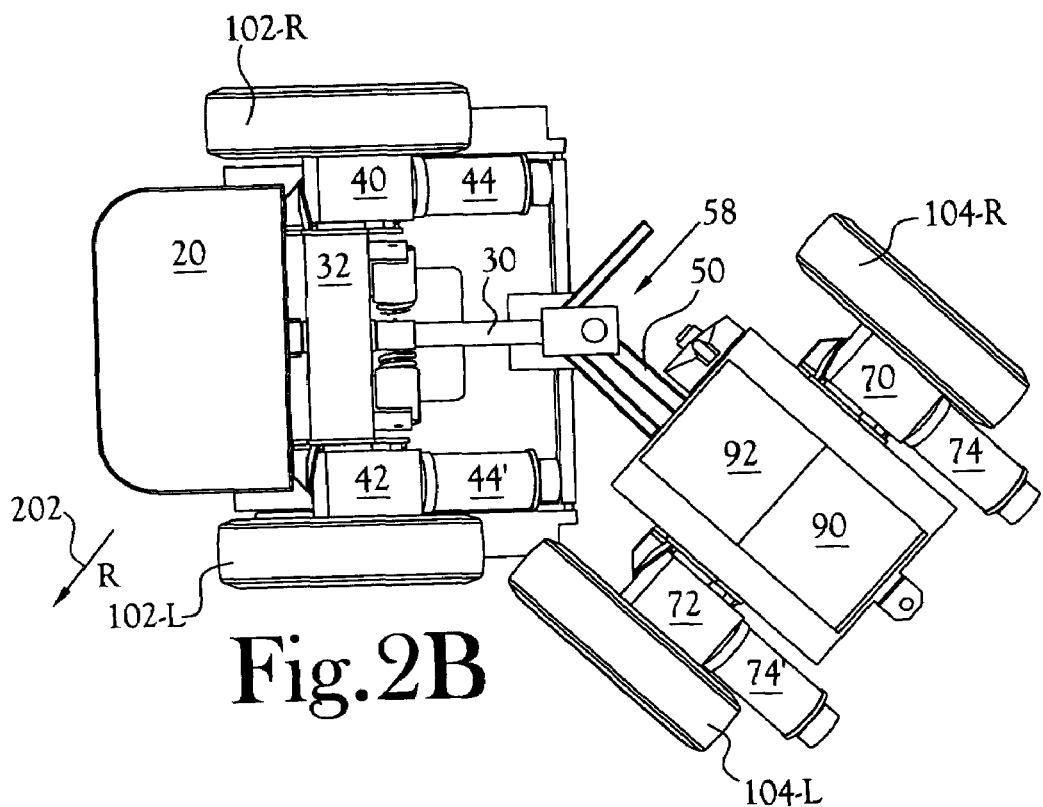
FIG. 2B is a bottom view of FIG. 2A, illustrating the front frame pivoted at the articulation joint in relation to the rear frame during a right turn.
Figure 2C:
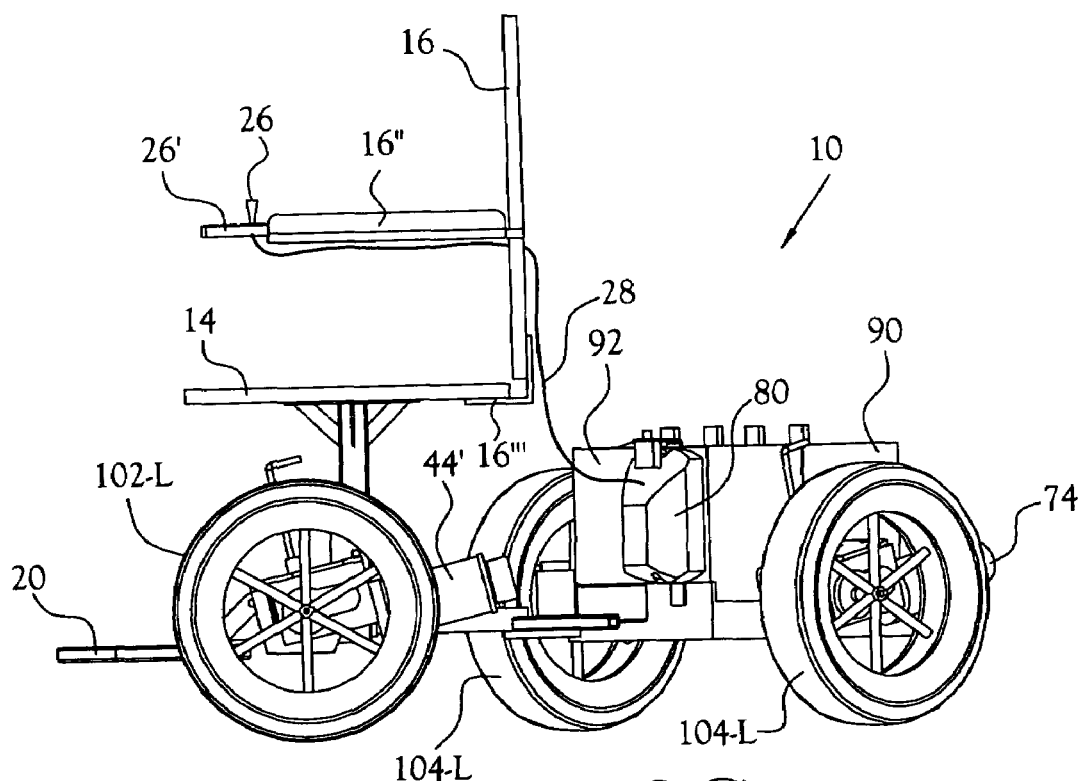
FIG. 2C is a right side view of FIG. 2A, illustrating the orientation of the seat assembly, front wheels, and rear wheels during a right turn.

As an example of the capability of the articulated wheelchair 10 to execute precise turns, FIGS. 2A-2C illustrate a right-hand turn 202. In order to execute turns within a small radius, each wheel 102-L, 102-R, 104-L, 104-R is independently controlled. Upon manipulation of the joy stick 26 in a forward position while indicating a right turn, the circuitry of the computer module 80 increases the rotation of front left axle 46 and left wheel 102-L by motor 44 and actuator 40 to begin a right turn, and to slow the rotation of right rear axle 66' and right rear wheel 104-R by motor 74' and actuator 72 thereby assisting in completion of a right turn. Also, for an immediate right turn, the circuitry of the computer module 80 slows the rotation of front right axle 46' and right front wheel 102-R by motor 44' and actuator 42, and to increase the rotation of left rear drive shaft 66 and left rear wheel 104-L by motor 74 and actuator 70 thereby assisting in completion of an immediate right turn by wheelchair 10. In order to execute an abrupt right turn as directed by the operator's abrupt turning of the joystick 26, to force wheelchair movement within essentially it's own footprint, the computer module 80 causes the actuator 42 and drive motor 44' to turn right front shaft 46' and front right wheel 102-R in reverse, while causing the actuator 40 and drive motor 44 to turn left front shaft 46 and front left wheel 102-L in a forward rotational direction, thereby forcing the front frame 30 to rotate right with rear frame 50 rotating at articulation joint 58 in the direction of front frame 30.

Figure 3A:
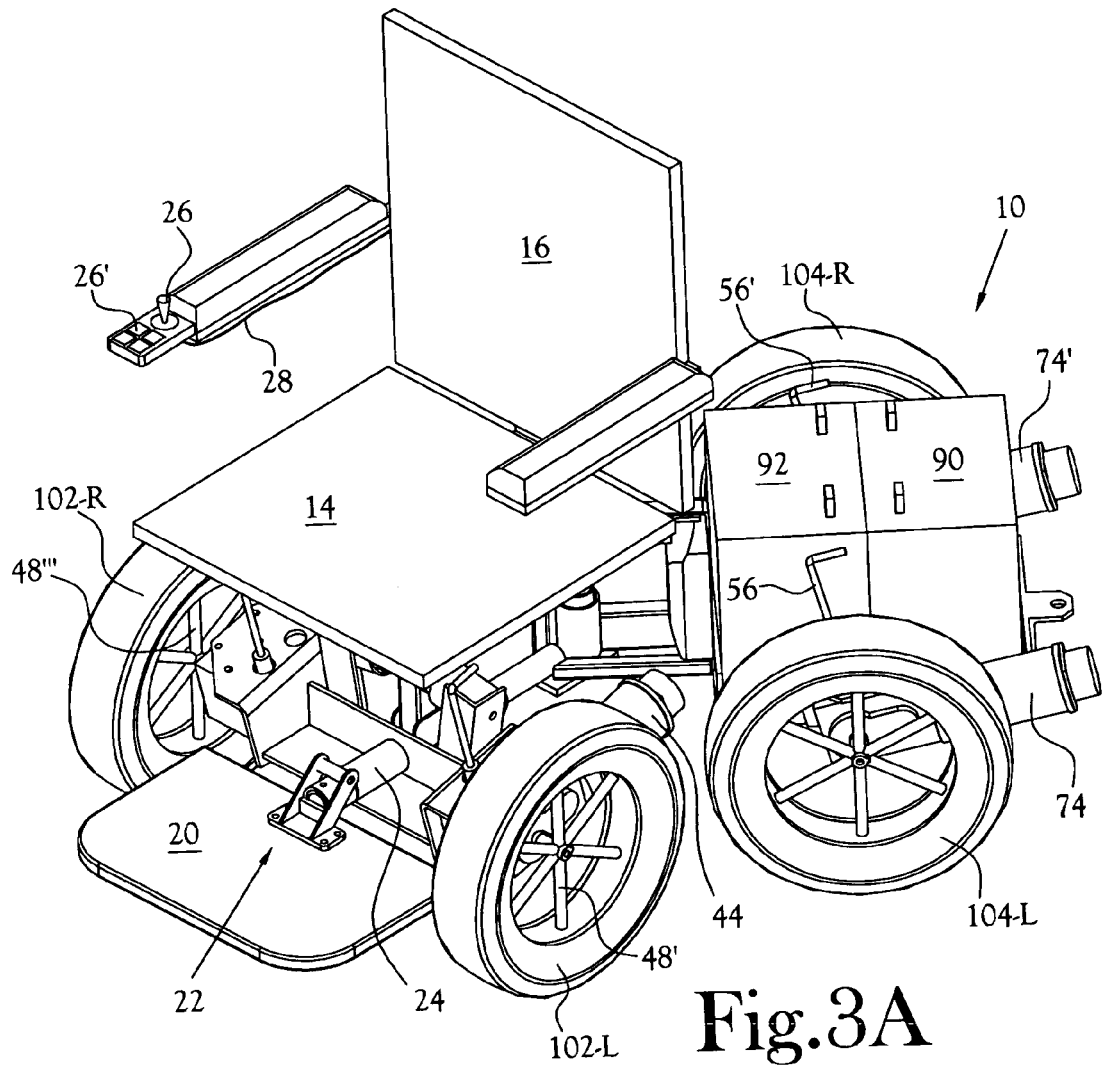
FIG. 3A is a perspective view of the wheelchair articulating for a left turn.
Figure 3B:
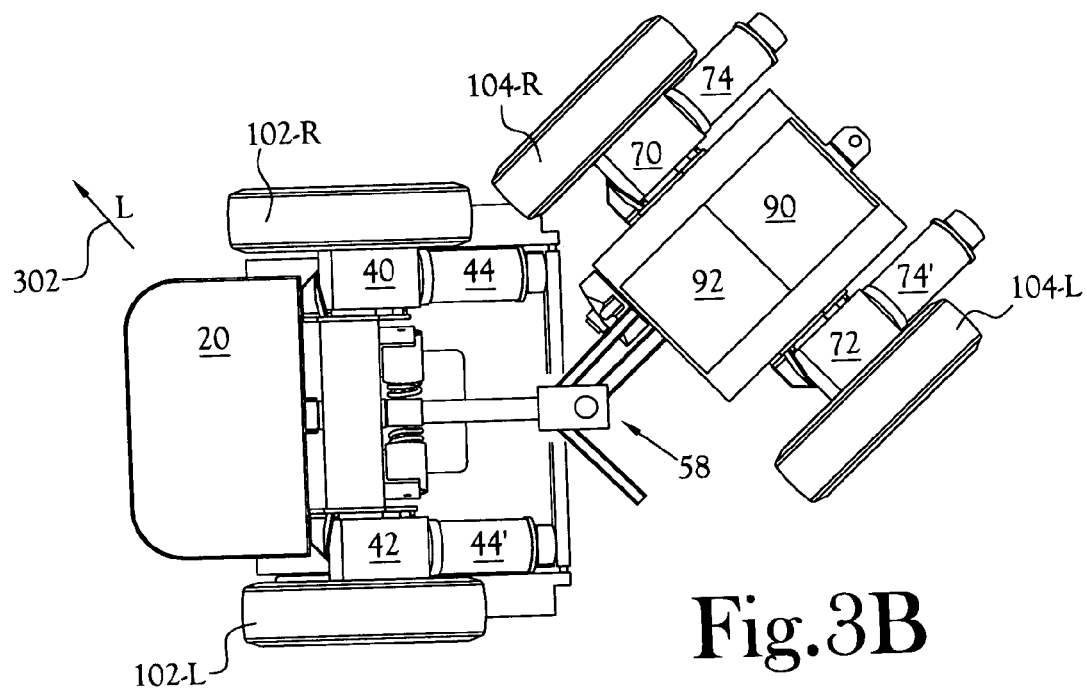
FIG. 3B is a bottom view of FIG. 3A, illustrating the front frame pivoted at the articulation joint in relation to the rear frame during a left turn.
Figure 3C:
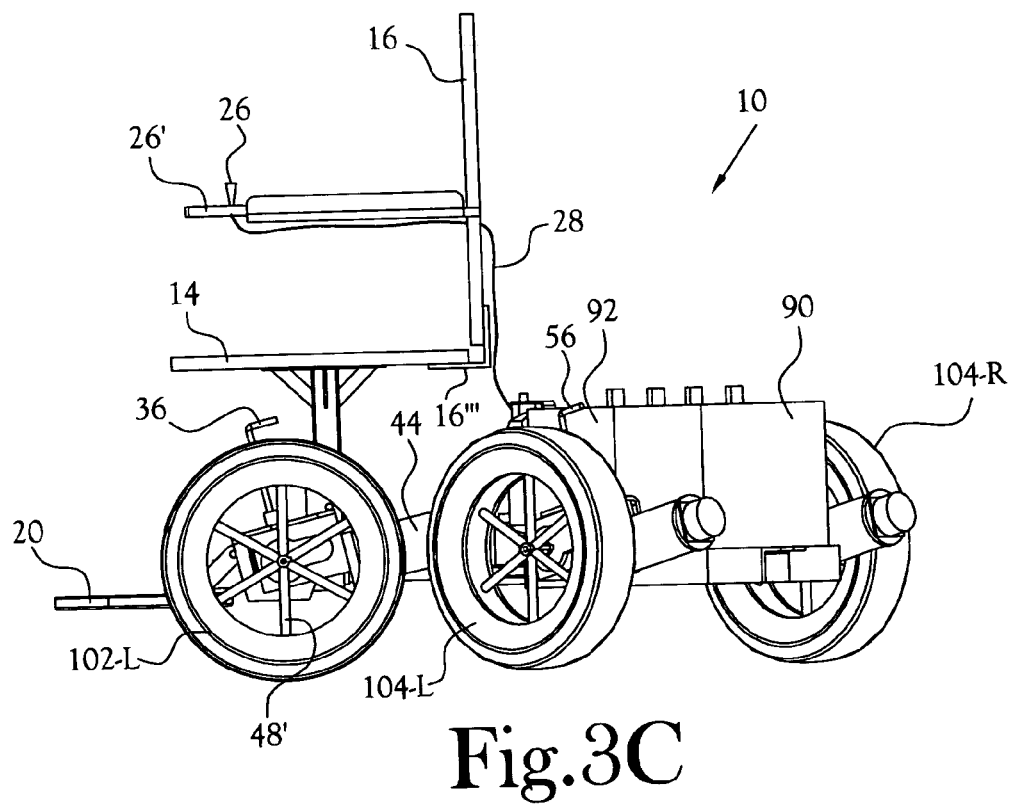
FIG. 3C is a side view of FIG. 3A, illustrating the orientation of the seat assembly, front wheels, and rear wheels during a left turn.

As an example of the capability of the articulated wheelchair 10 to execute precise turns, FIGS. 3A-3C illustrate a left-hand turn 302. In order to execute turns within a small radius, each wheel 102-L, 102-R, 104-L, 104-R is independently controlled.

As illustrated in FIGS. 3A-3C, a left-hand turn is accomplished by the articulated wheelchair 10 after the operator's manipulation of the joystick 26, in a forward position while indicating a left turn, the circuitry of the computer module 80 slows the rotation of front left axle 46 and left wheel 102-L by motor 44 and actuator 40, and increases the rotation of right rear axle 66' and right rear wheel 104-R by motor 74' and actuator 72 thereby assisting in initiation of a left turn. Also, for an immediate left turn, the circuitry of the computer module 80 increases the rotation of front right axle 46' and right front wheel 102-R by motor 44' and actuator 42, and slows the rotation of left rear drive shaft 66 and left rear wheel 104-L by motor 74 and actuator 70 thereby assisting in completion of an immediate left turn by wheelchair 10. In order to execute an abrupt left turn as directed by the operator's abrupt turning of the joystick 26, to force wheelchair movement within essentially it's own footprint, the computer module 80 causes the actuator 42 and drive motor 44' to turn right front shaft 46' and front right wheel 102-R in a forward direction, while causing the actuator 40 and drive motor 44 to turn left front shaft 46 and front left wheel 102-RL in a rearward rotational direction, thereby forcing front frame 30 to rotate left with rear frame 50 rotating at articulation joint 58 in the direction of front frame 30.

The articulated wheelchair 10 includes the ability to execute precise turns, to move forward, and to move backwards as directed by the occupant's manipulating of the joy stick 26 and associated controls 26'. Execution of tight turns is needed for self-propelled wheelchairs in order to move the occupant through narrow spaces as found in homes and buildings. The efficient turning movements by the articulated wheelchair 10 are provided by positioning the articulation joint 58 at the center of the wheelchair 10, along with the front support frame 30 being directed in a direction selected by the occupant by the pair of front drive units moving each front wheel at the same or different rotational speeds as required for turning. In addition, the rear support frame 50 is driven in the direction selected by the occupant by the pair of rear drive units moving each rear wheel at different rotational speeds. Further, the computer circuitry 80, and dual data channels 76, 78 provide for transmission of a plurality of control signals to each front pair of drive units 44, 44', and rear pair of drive units 74, 74', to allow precise turning of the articulated wheelchair 10.

Figure 5:
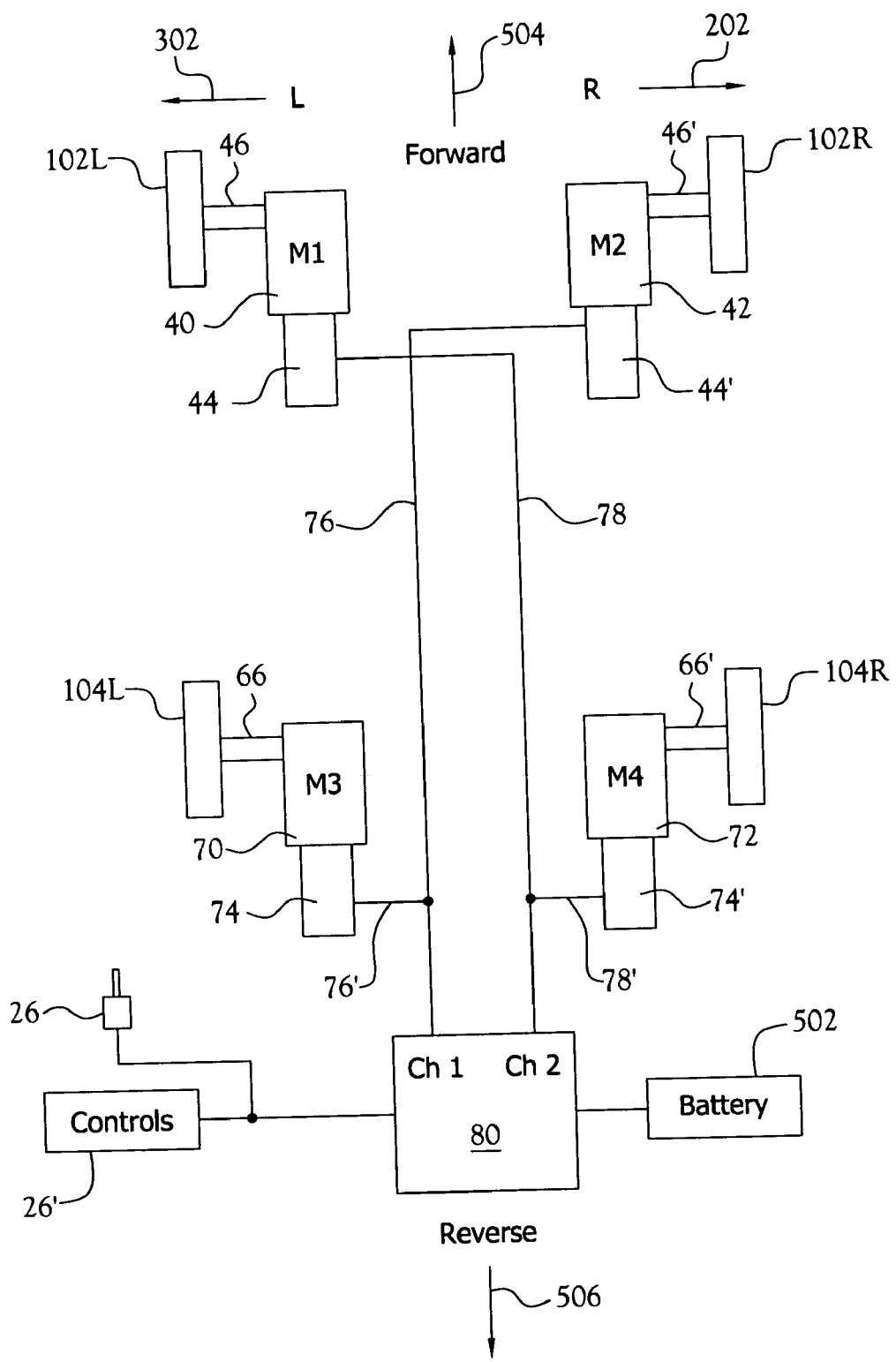
FIG. 5 is a block diagram of one embodiment of the articulated wheelchair.

FIG. 5 illustrates a block diagram of the driving mechanism of the articulated wheelchair 10. In the illustrated embodiment, the driving mechanism includes the battery 502, the controls 26, 26', the controller 80, and the motor assemblies M1, M2, M3, M4, which include the drive motors 44, 44', 74, 74', the wheel actuators 40, 42, 70, 74', and the wheel axles 46, 46', 66, 66'. The driving mechanism allows the articulated wheelchair 10 to be a self-propelled vehicle because the wheelchair 10 carries the power (battery 502), the controls 26, 26', and the motors 44, 44', 74, 74' necessary for locomotion.

The controller 80 receives power from the battery 202 and receives its command signals from the joystick 26 and the associated controls 26', collectively called the operator controls. In the illustrated embodiment, the controller 80 includes two output channels Ch1, Ch2 that provide power to the drive motors 44, 44', 74, 74'. One output channel Ch1 provides power to diametrically opposed motors 74, 44' via cables 76, 76'. The other output channel Ch2 provides power to diametrically opposed motors 44, 74' via cables 78, 78'. In other embodiments, other types of controllers than the illustrated two channel controller 80 are used, for example, a processor connected to the joystick 26 and the associated controls 26' with the processor connected to a controller for each drive motor 44, 44', 74, 74'.

In operation, when the joystick 26 is operated to move the wheelchair 10 left 302, the controller 80 causes the right front wheel 102-R and the left rear wheel 104-L to rotate at a speed different than the speed of the left front wheel 102-L and the right rear wheel 104-R, thereby causing the wheelchair 10 to pivot about the articulation joint 58 reducing the turning angle 98 as the wheelchair 10 turns left 302. Once the degree of articulation of the wheelchair 10 is achieved, the joystick 10 is operated to move the wheelchair 10 forward 504, the wheelchair moves forward 504 in a left circular path. If the joystick 10 is operated to move the wheelchair 10 reverse 506, the wheelchair moves in reverse 506 in a left circular path.

If the operator moves the joystick 26 to move the wheelchair 10 to an extreme left 302 turning position, the controller 80 causes the right front wheel 102-R and the left rear wheel 104-L to rotate in the forward 504 moving direction and the left front wheel 102-L and the right rear wheel 104-R to rotate in the reverse 506 moving direction, thereby causing the wheelchair 10 to pivot about the articulation joint 58 reducing the turning angle 98 as the wheelchair 10 turns left 302. Once the degree of articulation of the wheelchair 10 is achieved, the joystick 10 is operated to move the wheelchair 10 forward 504, the wheelchair moves forward 504 in a left circular path. If the joystick 10 is operated to move the wheelchair 10 reverse 506, the wheelchair moves in reverse 506 in a left circular path.

When the joystick 26 is operated to move the wheelchair 10 right 202, the controller 80 causes the left front wheel 102-L and the right rear wheel 104-R to rotate at a speed different than the speed of the right front wheel 102-R and the left rear wheel 104-L, thereby causing the wheelchair 10 to pivot about the articulation joint 58 reducing the turning angle 98' as the wheelchair 10 turns right 202. Once the degree of articulation of the wheelchair 10 is achieved, the joystick 10 is operated to move the wheelchair 10 forward 504, the wheelchair moves forward 504 in a right circular path. If the joystick 10 is operated to move the wheelchair 10 reverse 506, the wheelchair moves in reverse 506 in a right circular path.

If the operator moves the joystick 26 to move the wheelchair 10 to an extreme right 202 turning position, the controller 80 causes the left front wheel 102-L and the right rear wheel 104-R to rotate in the forward 504 moving direction and the right front wheel 102-R and the left rear wheel 104-L to rotate in the reverse 506 moving direction, thereby causing the wheelchair 10 to pivot about the articulation joint 58 reducing the turning angle 98' as the wheelchair 10 turns right 202. Once the degree of articulation of the wheelchair 10 is achieved, the joystick 10 is operated to move the wheelchair 10 forward 504, the wheelchair moves forward 504 in a right circular path. If the joystick 10 is operated to move the wheelchair 10 reverse 506, the wheelchair moves in reverse 506 in a right circular path.

After the wheelchair 10 has turned left 302 or right 202 a sufficient amount, as determined by the operator, operation of the joystick 26 in the opposite direction, right 202 or left 302, allows the wheelchair 10 to straighten by reversing the rotation of the wheels 102, 104 until the two left wheels 102-L, 104-L and the two right wheels 104-R, 104-R are in parallel alignment.

The wheelchair 10 includes various functions. The function of connecting the front frame member 30 to the rear frame member 50 is implemented, in one embodiment, by the articulation joint 58 connecting the members 30, 50. In one embodiment, the articulation joint 58 includes a pivot connector 60 received by a cylindrical pivot receiver 64, as illustrated in FIG. 4C.

The function of causing the articulated frame assembly to pivot by the rotation of the first wheel 102-R relative to the second wheel 102-L is implemented, in one embodiment, by the controller 80 connected to the drive motors 44, 44', which causes the left front wheel 102-L to rotate with a different speed than the right front wheel 102-R. In another embodiment, the left front wheel 102-L and the right rear wheel 104-R rotate with a different speed than the right front wheel 102-R and the left rear wheel 104-L.

The function of manually operating said articulated wheelchair 10 by the person seated in said seat is implemented, in one embodiment, by the joystick 26 and associated controls 26'.

The function of causing the articulated frame assembly to pivot by the rotation of the third wheel 104-R relative to the fourth wheel 104-L, in conjunction with the rotation of the first wheel 102-R relative to the second wheel 102-L, is implemented, in one embodiment, by the controller 80 connected to the drive motors 44, 44', 74, 74', which causes the left front wheel 102-L and the right rear wheel 104-R to rotate with a different speed than the right front wheel 102-R and the left rear wheel 104-L.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An articulated wheelchair for transporting a person, said articulated wheelchair comprising:
    an articulated frame assembly having a front frame member and a rear frame member, said front frame member having a first wheel and a second wheel;
    a driving mechanism allowing said articulated wheelchair to be a self-propelled vehicle;
    a seat attached to said articulated frame assembly for carrying a person,
    a means for connecting said front frame member and said rear frame member whereby said front frame member and said rear frame member pivot relative to each other; and
    a means for causing said articulated frame assembly to pivot by a rotation of said first wheel relative to said second wheel.

2. The articulated wheelchair of claim 1 wherein said seat is attached to said front frame member.

3. The articulated wheelchair of claim 1 further including a means for manually operating said articulated wheelchair by the person seated in said seat.

4. The articulated wheelchair of claim 1 wherein said rear frame member includes a third wheel and a fourth wheel, and further including a means for causing said articulated frame assembly to pivot by a rotation of said third wheel relative to said fourth wheel in conjunction with said rotation of said first wheel relative to said second wheel.

* * * * *